(12) United States Patent
Chen

(10) Patent No.: US 7,192,004 B2
(45) Date of Patent: Mar. 20, 2007

(54) ELECTRIC DRIVING DEVICE FOR A VALVE

(76) Inventor: Shui-Ching Chen, No. 81, Lane 355, San Kang Road, Lung Ching Tsun, Lung Ching Hsiang, Taichung Hsien (TW)

( * ) Notice: Subject to any disclaimer, the term of this patent is extended or adjusted under 35 U.S.C. 154(b) by 102 days.

(21) Appl. No.: 11/146,385

(22) Filed: Jun. 7, 2005

(65) Prior Publication Data

US 2006/0273273 A1 Dec. 7, 2006

(51) Int. Cl.
*F16K 31/02* (2006.01)

(52) U.S. Cl. .............................. 251/129.03; 251/129.11; 251/249.5; 74/625

(58) Field of Classification Search ................ 251/248, 251/250.5, 129.03, 129.11, 129.13, 249.5; 74/625, 425
See application file for complete search history.

(56) References Cited

U.S. PATENT DOCUMENTS

| 331,075 | A | * | 11/1885 | Miles | ........................ | 408/133 |
| 1,582,214 | A | * | 4/1926 | Gray | ........................... | 251/14 |
| 4,265,142 | A | * | 5/1981 | Watanabe | ..................... | 74/625 |
| 6,129,337 | A | * | 10/2000 | Wu | ............................. | 251/248 |
| 6,962,320 | B2 | * | 11/2005 | Ozawa | ................... | 251/129.11 |

* cited by examiner

*Primary Examiner*—Eric Keasel
*Assistant Examiner*—John K. Fristoe, Jr.

(57) ABSTRACT

An electric driving device for a valve includes a lower casing member, a cover plate, a driving unit, a cylindrical part, a control part, a third rod and a fourth rod. The cover plate closes the open top of the lower casing member. The driving unit has an electric motor with a shaft being attached with a first gear. The cylindrical part with an axial bore is fixedly attached to the outer side of the lower casing member. The control unit has a first rod with being attached with a second gear to mesh with the first gear and a first elastic member is disposed on the first rod next to the first gear. A third gear is disposed next to the first elastic member and the second rod with the front section thereof being attached with a fourth gear. The third rod is disposed near the first rod in parallel with a fifth gear being attached to a front section thereof and a sixth gear being attached to a rear section thereof to mesh with the third gear. The fourth rod is attached with a seventh gear to mesh with the fifth gear.

3 Claims, 10 Drawing Sheets

ELECTRIC DRIVING DEVICE FOR A VALVE

BACKGROUND OF THE INVENTION

1. Field of the Invention

The present invention is related to a valve and particularly to an electric driving device for a valve.

2. Brief Description of the Related Art

Usually, the conventional valve is opened or shut with manual operation but manual operation needs great effort and takes time. In order to overcome the deficiency, the electric motor has been applied to drive a gear train for opening and shutting the valve. However, it still needs to operate with hand in case of power failure. In addition, the prior structure allows the motor shaft rotates while the user operates the hand wheel to open or shut the valve such that a much great effort has to be exerted. Moreover, it is frequent that a lot of valves have to be operated in a working field and the operator becomes exhausted after all the valves have been opened or shut.

SUMMARY OF THE INVENTION

A primary object of the present invention is to provide an electric driving device for a valve, which is available for the user to open or shut manually with much less effort in case of power failure, so that the preceding trouble residing in the prior art can be solved effectively.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
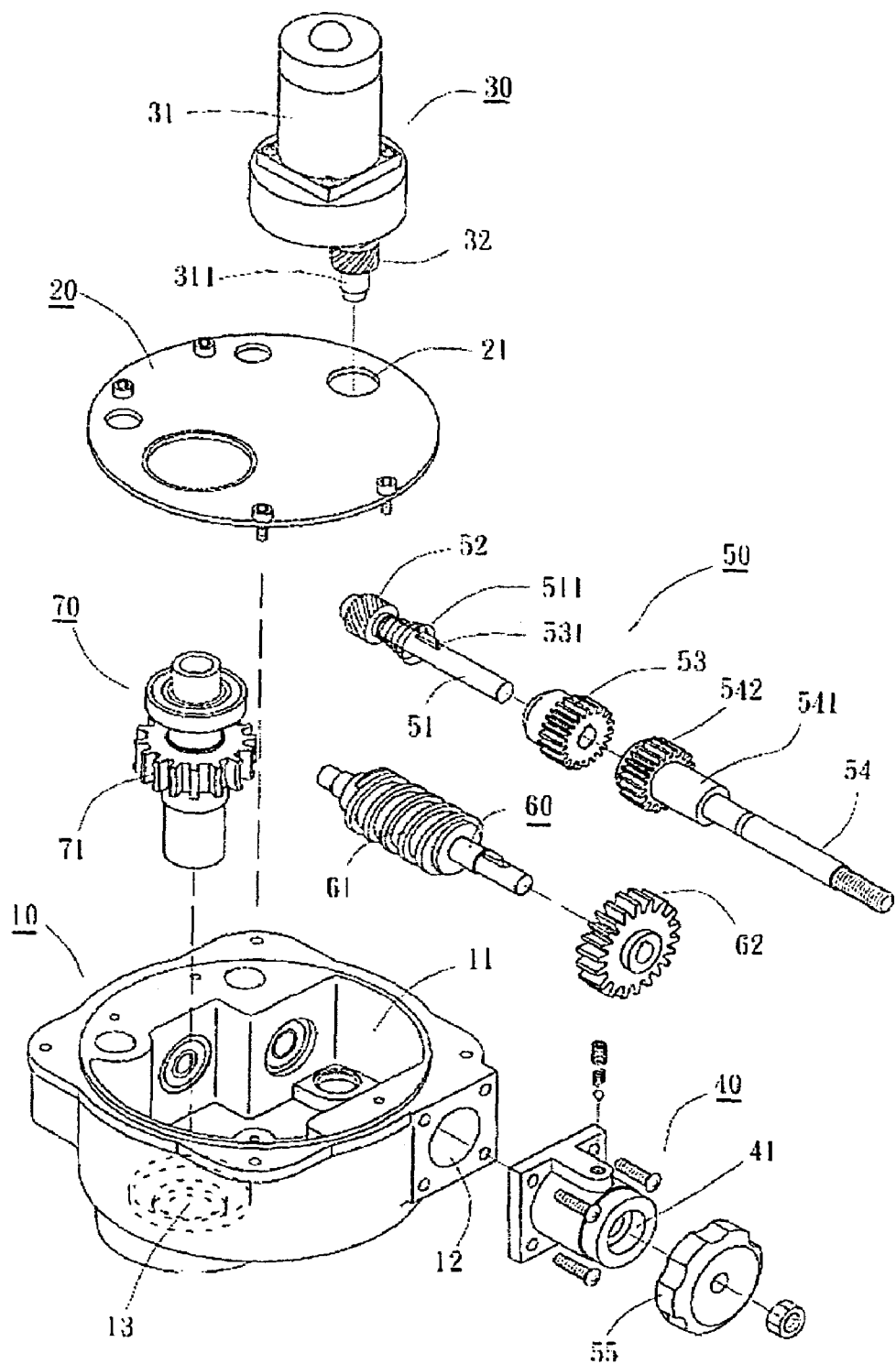
FIG. 1 is an exploded perspective of the first embodiment of an electric driving device for a valve according to the present invention.
Figure 2:
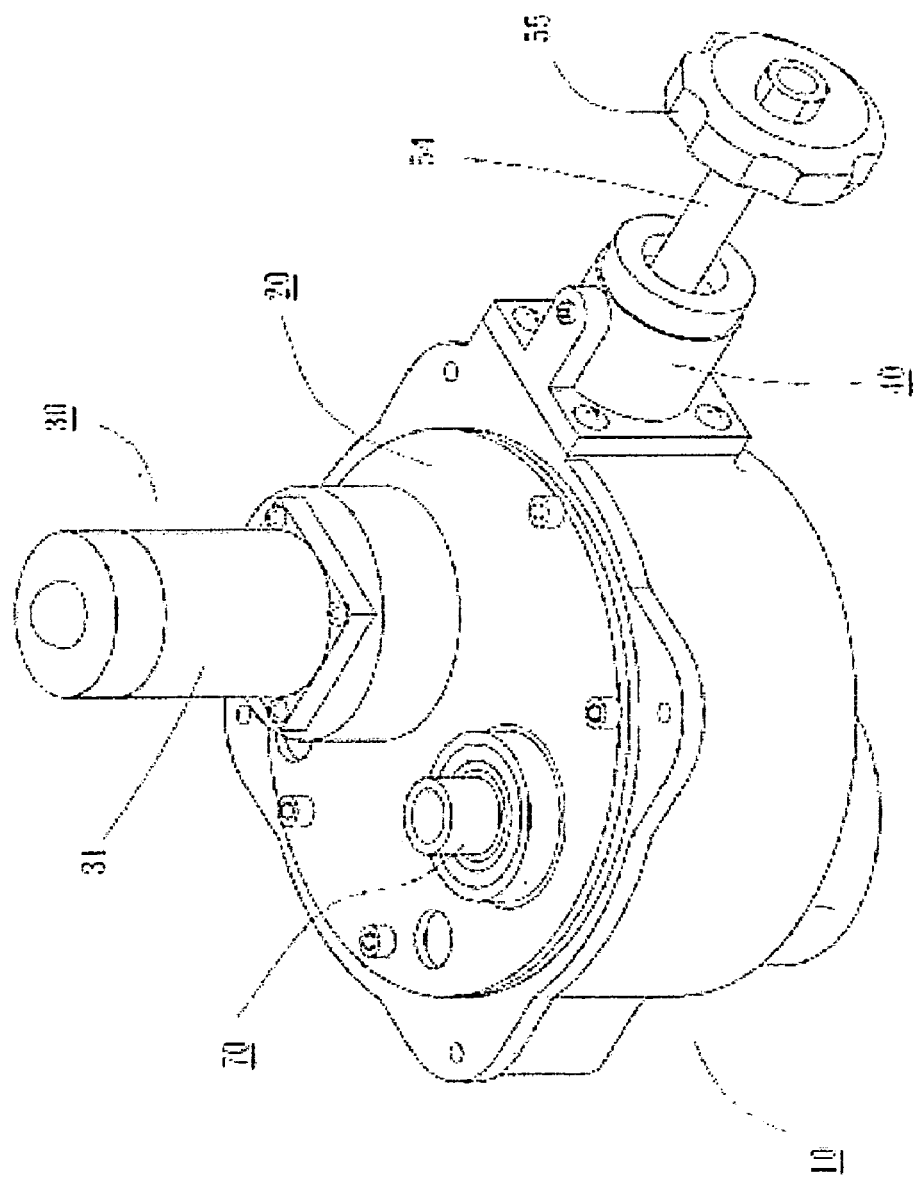
FIG. 2 is an assembled perspective of FIG. 1.
Figure 3:
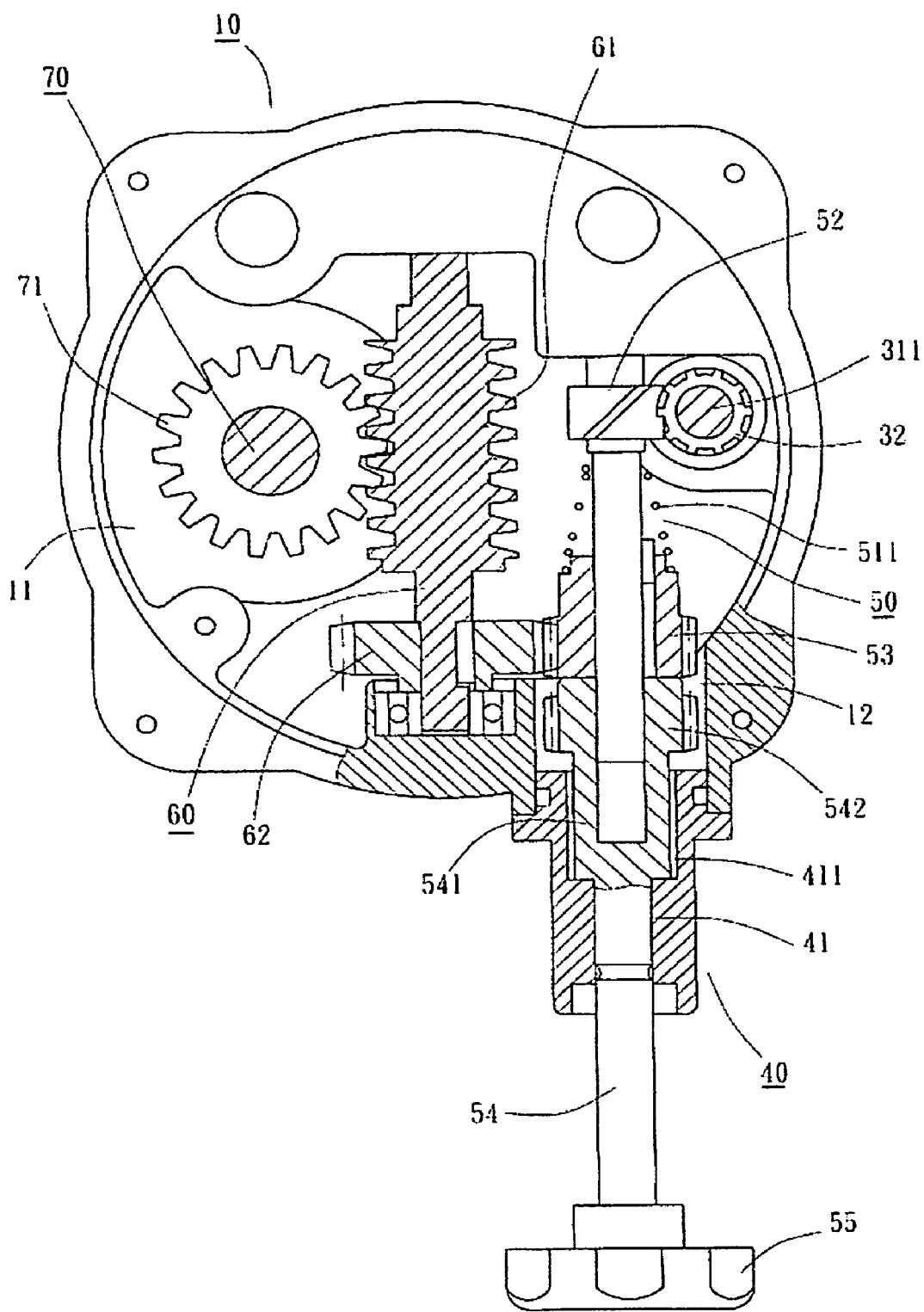
FIG. 3 is a partly sectional view of the first embodiment of an electric driving device for a valve according to the present invention illustrating structure characteristics thereof.

Referring to FIGS. 1 to 4, the first embodiment of an electric driving device for a valve according to the present invention includes a lower casing member 10, a cover plate 20, a driving unit 30, a cylindrical part 40, a control unit 50, a third rod member 60 and a fourth rod member 70.

The lower casing member 1 has a containing space 11 therein with an open top, a through hole 12 being disposed at the right lateral wall thereof and an outlet 13 at the left bottom thereof.

The cover plate 20 is used for closing the open top of the lower casing member 1. A cover hole 21 is provided at the cover plate 20.

The driving unit 30 further has an electric mover 31. The electric mover 31 is disposed above the cover hole 21 and a speed reduction gear train (not shown) is provided under the electric mover 31. The output shaft 311 of the speed reduction gear train passes through the cover hole 21 with the lower end thereof being movably attached to the bottom wall of the lower casing 10. A first gear 32 is provided at the shaft 311.

The cylindrical part 40 has an axial bore 41 penetrating the front and rear ends thereof with an enlarged inner diameter section 411 therein such that the cylindrical part 40 can be fixedly attached to the outer side of the lower casing member 10 by a fastener with the axial hole aligning with the hole 12.

The control unit 50 has a first rod 51 and the front end of the first rod 51 is connected to the front inner wall of the lower casing member 10 and the rear end of the first rod 51 is disposed in the hole 12. The front section of the first rod 51 is attached with a second gear 52 to mesh with the first gear 32. A first elastic member 511 is disposed on the first part next to the first gear 32 and the first elastic member 511 shown in the figures is a spring. A third gear 53 is disposed next to the first elastic member 511 and slidably attached to the first rod 51 with a key 531. A second rod 54 with an enlarged section 541 is disposed next to the first rod 51 and the enlarged section is attached with a fourth gear 542. The front section of the second rod 54 has a blind hole 543 to fit with the rear section of the first rod 51 and the rear section of the second rod 54 extends outward the cylindrical part 40 with the rear end thereof being joined to a hand wheel 55.

The third rod 60 is disposed near the first rod 50 in parallel with the front and rear ends thereof connecting with the front and rear walls of the containing space 11 respectively. A fifth gear is attached to the front section of the third rod 60 and a sixth gear 62 is attached to the rear section of the third rod 60 to mesh with the third gear 53.

The fourth rod 70 is disposed at the left side of the third rod 60 and connects with the cover plate 20 at the top end thereof and the lower section of the fourth rod 70 passes through the outlet 13 of the lower casing member 10. A seventh gear 71 is attached to the fourth rod 70 to mesh with the fifth gear 61.

Under normal condition, the electric motor 31 drives the first gear 32 to turn the first rod 51 and the turning force is transmitted to the sixth gear 62 via the third gear 53 so as to turn the third rod 60. Finally, the turning force is transmitted to the seventh gear 71 via the fifth gear 61 to operate a valve under the fourth rod 70 such that it is capable of controlling open and shut of the valve.

Figure 4:
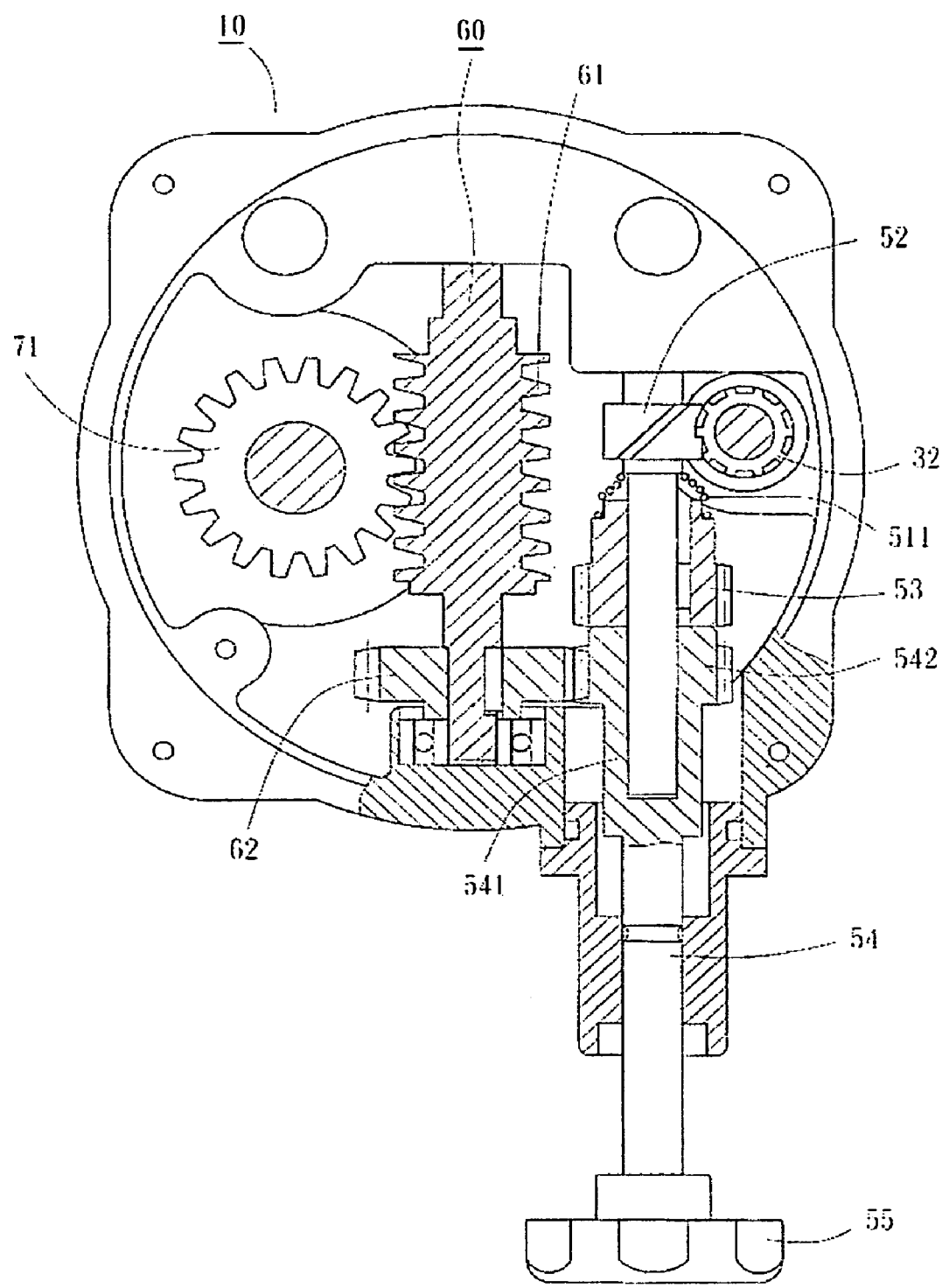
FIG. 4 is a partly sectional view of the first embodiment of an electric driving device for a valve according to the present invention illustrating the electric driving device being in operation.
Figure 5:
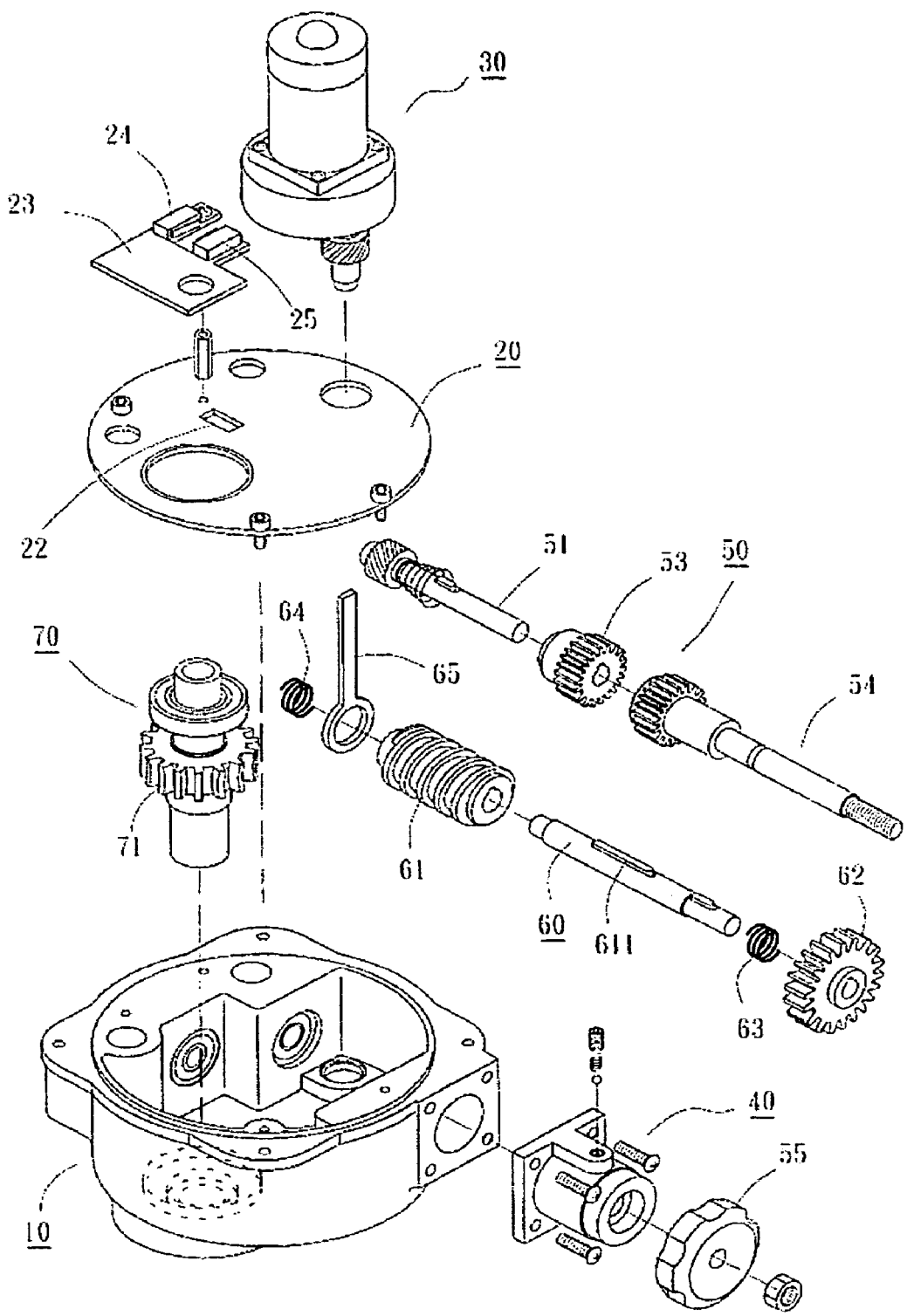
FIG. 5 is an exploded perspective of the second embodiment of an electric driving device for a valve according to the present invention.
Figure 6:
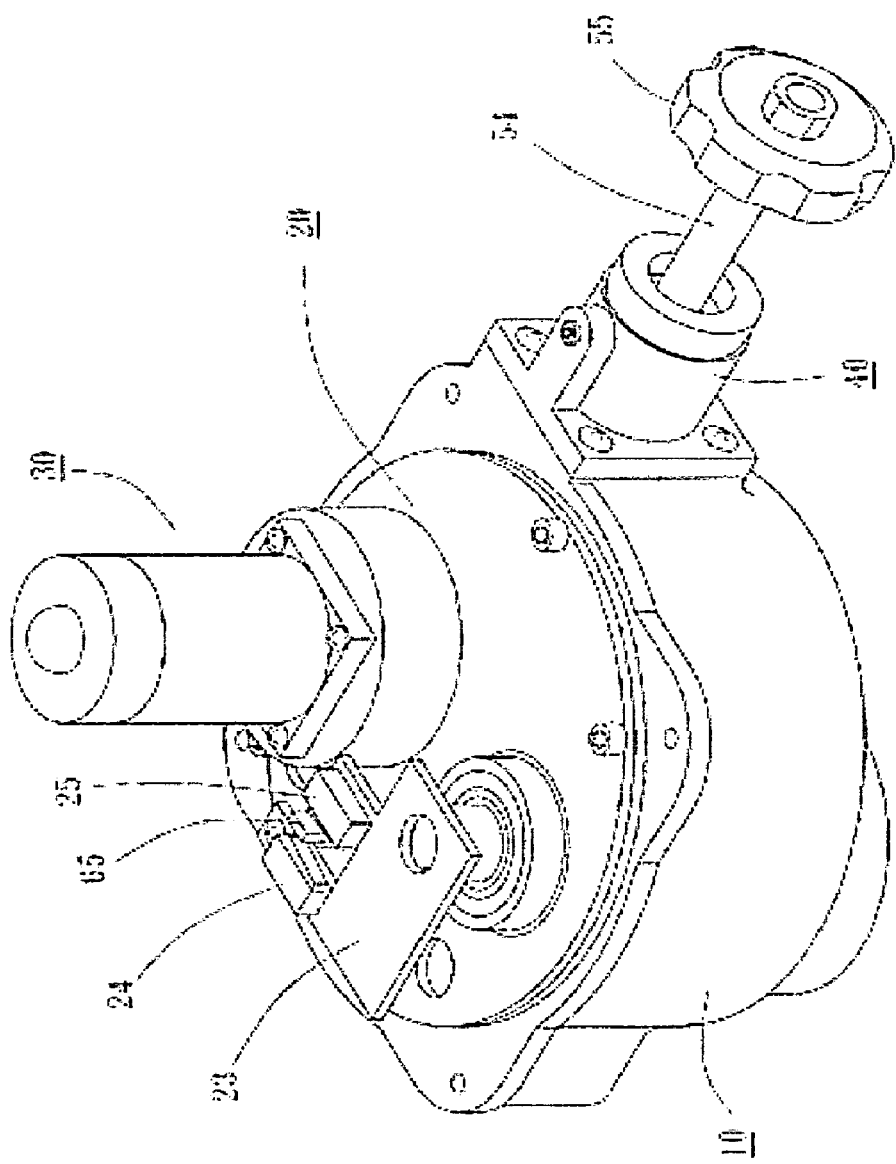
FIG. 6 is an assembled perspective of FIG. 5.
Figure 7:
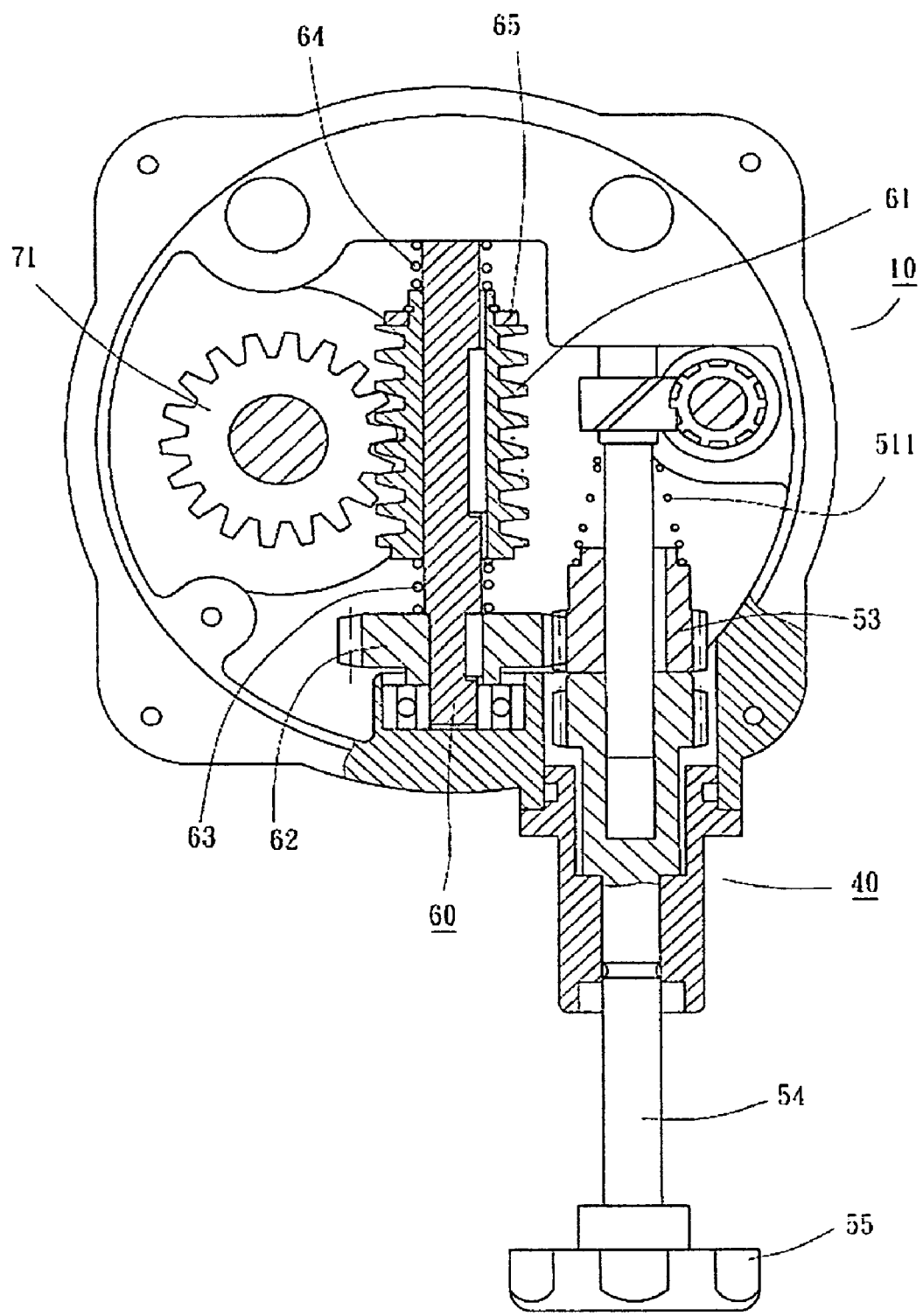
FIG. 7 is a partly sectional view of the second embodiment of an electric driving device for a valve according to the present invention illustrating characteristics of the present invention.
Figure 8:
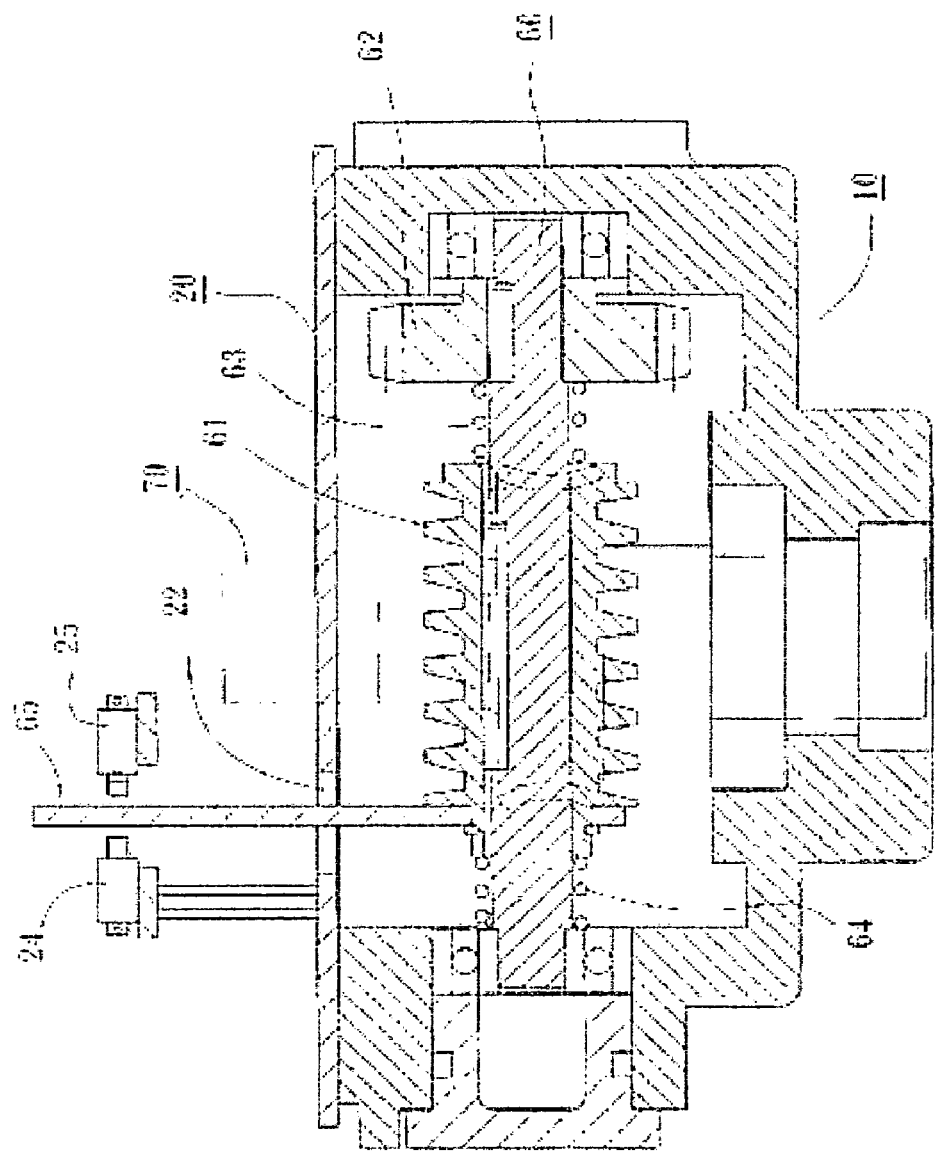
FIG. 8 is a sectional view of the second embodiment of an electric driving device for a valve according to the present invention illustrating characteristics of the present invention.

Referring to FIG. 4, in case of power being failure or the power system being out of order, which results in the electric motor being incapable of starting, the user can hold the turn wheel 55 and push the turn wheel forward to allow the third gear 53 being away from the sixth gear 62. Under this circumference, it makes the fourth gear 542 meshing with the sixth gear 62 and the fourth gear 542 can drive the sixth gear 62 once the user turns the turn wheel 55. Hence, the valve under the fourth rod 70 can be controlled to open or shut as well.

The user can exerts a light force to pull the second rod 54 back to the original position and the first elastic member 511 then can restore to its original shape such that the third gear 53 is pushed to its original position and the sixth gear 62 meshes the third gear 53 too.

Referring to FIGS. 5 to 10, the second embodiment of the present invention is illustrated. The difference of the present embodiment is described hereinafter.

The cover plate 20 provides a rectangular opening 22 corresponding to the rear section of the third rod 60. A flat member 23 is disposed a specific distance above the rectangular opening 22 with a cutout corner 231 corresponds to the opening 22. A micro switch 24 is provided on the flat member 23 next to the cutout corner 231.

The fifth gear 61 is slidably attached to the third rod 60 with a key 611 and a second elastic member 63 is added between the fifth gear 61 and the sixth gear 62. A third elastic member 64 is added between the fifth gear 61 and the rear wall of the containing space 11. The second and third elastic members 53, 64 shown in the figures are springs. Further, a safety arm 65 is provided next to an end of the fifth gear 61 with the upper end thereof passing through the opening 22 and disposed between the micro switch 25 and another micro switch 24 beside the micro switch 24.

Figure 9:
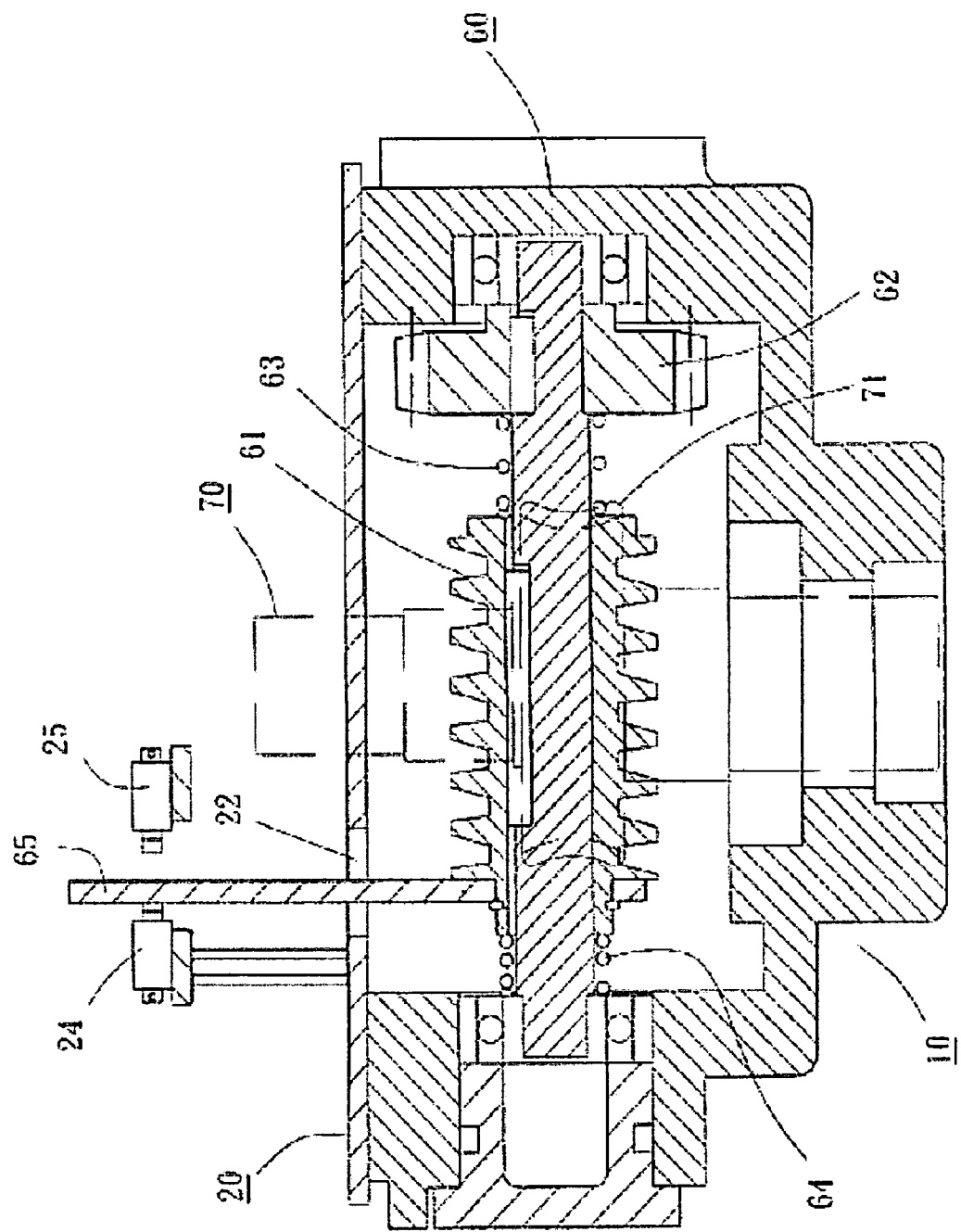
FIG. 9 is a sectional view of the second embodiment of an electric driving device for a valve according to the present invention illustrating the electric driving device being in a state of operation.

Referring to FIG. 9, when the valve is shut, the valve gate is closed and the fourth rod 70 stops to rotate. The third gear 53 keeps to drive the sixth gear 62 turning counterclockwise in spite of the valve being started or shut electrically. Right at this time, the fifth gear 61 is incapable of driving the seventh gear 71 and it results in the fifth gear 61 and the safety arm 65 moving forward. Once the upper end of the safety arm 65 touches the first micro switch 24, the electric motor 31 is turned off to avoid damage of the valve and enhance safety in use.

Figure 10:
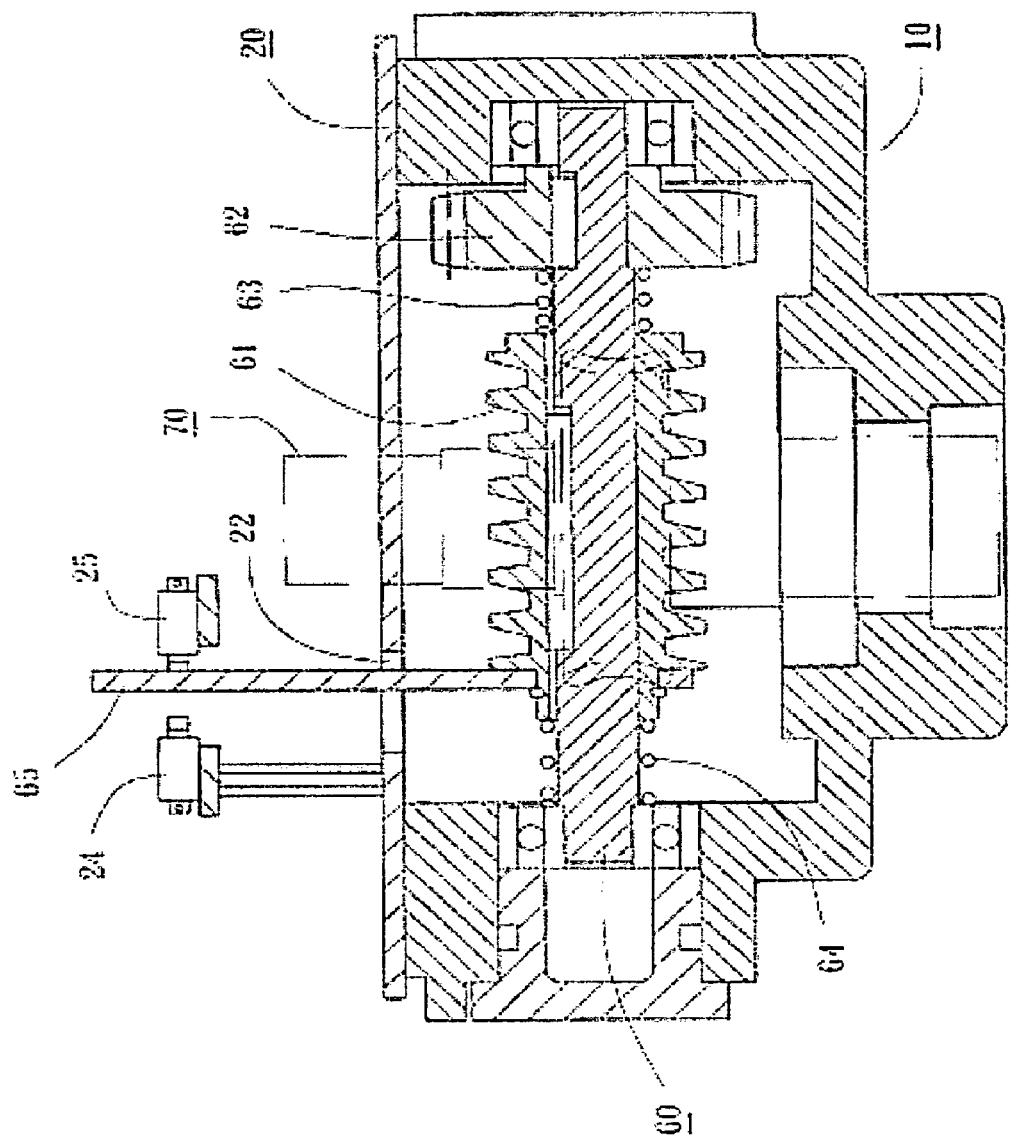
FIG. 10 is another sectional view of the second embodiment of an electric driving device for a valve according to the present invention illustrating the electric driving device being in a state of operation.

Contrarily, as shown in FIG. 10, in case of the valve gate being opened completely, the third gear 53 keeps driving the sixth gear 62 to turn clockwise. Because the fifth gear 61 is incapable of driving the seventh gear 71, the fifth gear 61 moves backward with the safety arm 65 and the electric motor 31 is turned off once the upper end of the safety arm 65 touches the second micro switch 25.

While the invention has been described with referencing to a preferred embodiment thereof, it is to be understood that modifications or variations may be easily made without departing from the spirit of this invention, which is defined by the appended claims.

What is claimed is:

1. An electric driving device for a valve, comprising:
   a lower casing member, having a containing space therein with an open top, a through hole being disposed at the right lateral wall thereof and an outlet being at the left bottom thereof;
   a cover plate with a cover hole, being used for closing the open top of the lower casing member;
   a driving unit, having an electric motor disposed above the cover hole, a speed reduction gear train being provided under the electric motor, an output shaft of the speed reduction gear train passing through the cover hole with the lower end thereof being movably attached to the bottom wall of the lower casing and a first gear being provided at the output shaft;
   a cylindrical part, having an axial bore penetrating the front and rear ends thereof with an enlarged inner diameter section therein such that the cylindrical part is fixedly attached to the outer side of the lower casing member by a fastener with the axial hole aligning with the cover hole;
   a control unit, having a first rod with the front end thereof being connected to a front inner wall of the lower casing member, a rear end of the first rod being disposed in the cover hole, the front end of the first rod being attached with a second gear to mesh with the first gear, a first elastic member being disposed on the first rod next to the first gear, a third gear being disposed next to the first elastic member and being slidably attached to the first rod with a key, a second rod with an enlarged section being disposed next to the first rod with the enlarged section being attached with a fourth gear, a front section of the second rod having a blind hole to fit with a rear section of the first rod and the rear section of the second rod extending outward the cylindrical part with the rear end thereof being joined to a hand wheel;
   a third rod, being disposed near the first rod in parallel with the front and rear ends thereof connecting with a front and a rear walls of the containing space respectively, a fifth gear being attached to a front section thereof and a sixth gear being attached to a rear section thereof to mesh with the third gear; and
   a fourth rod, being disposed at the left side of the third rod and connecting with the cover plate at the top end thereof and the lower section of the fourth rod passing through the outlet of the lower casing member and being attached with a seventh gear to mesh with the fifth gear.

2. The electric driving device for a valve as defined in claim 1, wherein
   the cover plate provides a rectangular opening corresponding to the rear section of the third rod, a flat member is disposed a specific distance above the rectangular opening with a cutout corner corresponding to the opening and a micro switch is provided on the flat member next to the cutout corner; and
   the fifth gear is slidably attached to the third rod with a key and a second elastic member is added between the fifth gear and the sixth gear, a third elastic member is added between the fifth gear and the rear wall of the containing space, a safety arm is provided next to an end of the fifth gear with the upper end thereof passing through the opening and disposed between the micro switch and a second micro switch beside the micro switch 24.

3. The electric driving device for a valve as defined in claim 2, wherein the second and the third elastic members are spring.

* * * * *